(12) United States Patent
Yu

(10) Patent No.: US 7,755,849 B2
(45) Date of Patent: Jul. 13, 2010

(54) LENS AND RELATED LENS ASSEMBLY

(75) Inventor: Sheng-Jung Yu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/233,823

(22) Filed: Sep. 19, 2008

(65) Prior Publication Data
US 2009/0251790 A1 Oct. 8, 2009

(30) Foreign Application Priority Data
Apr. 2, 2008 (CN) .................. 2008 1 0300816

(51) Int. Cl.
G02B 15/14 (2006.01)
G02B 3/00 (2006.01)
G02B 9/04 (2006.01)

(52) U.S. Cl. .................. 359/691; 359/642; 359/703; 359/741; 359/793; 359/796

(58) Field of Classification Search ............. 359/642, 359/691, 703, 741, 793, 796
See application file for complete search history.

(56) References Cited

U.S. PATENT DOCUMENTS 3,765,748 A * 10/1973 Mito .................. 359/701
7,042,659 B2 * 5/2006 Huang et al. ............. 359/796

* cited by examiner

Primary Examiner—Evelyn A. Lester
(74) Attorney, Agent, or Firm—Andrew C. Cheng

(57) ABSTRACT

An exemplary lens includes an optical axis, an optically active part, and an optically inactive part surrounding the optically active part. The optically inactive part includes a base and a peripheral sidewall extending in a direction parallel to the optical axis. The base is connected with the active part. The side wall is a hollow cylinder. The sidewall has an internal thread formed on an internal surface thereof.

16 Claims, 4 Drawing Sheets

LENS AND RELATED LENS ASSEMBLY

BACKGROUND

1. Technical Field

The present invention relates to the optical imaging field, and particularly, to a lens and a lens assembly having the same.

2. Description of Related Art

With the development of the optical imaging technology, lens modules are widely used in a variety of portable electronic devices, such as mobile phones, and Personal Digital Assistants (PDAs). Nowadays, the portable electronic devices have become more light-weight, and smaller in volume. Accordingly, it is required for the lens modules to be more light-weight and smaller in volume.

A typical lens module includes a barrel and a plurality of lenses received in the barrel. However, such lens module is relatively large in volume, heavy, and has a complicated structure.

Therefore, a new lens and a new lens assembly are desired to overcome the above mentioned problems.

SUMMARY

An exemplary lens includes an optical axis, an optically active part, and an optically inactive part surrounding the optically active part. The optically inactive part includes a base and a peripheral sidewall extending in a direction parallel to the optical axis. The base is connected with the active part. The side wall is a hollow cylinder. The sidewall has an internal thread formed on an internal surface thereof.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Embodiments will now be described in detail below with reference to the drawings.

Figure 1:
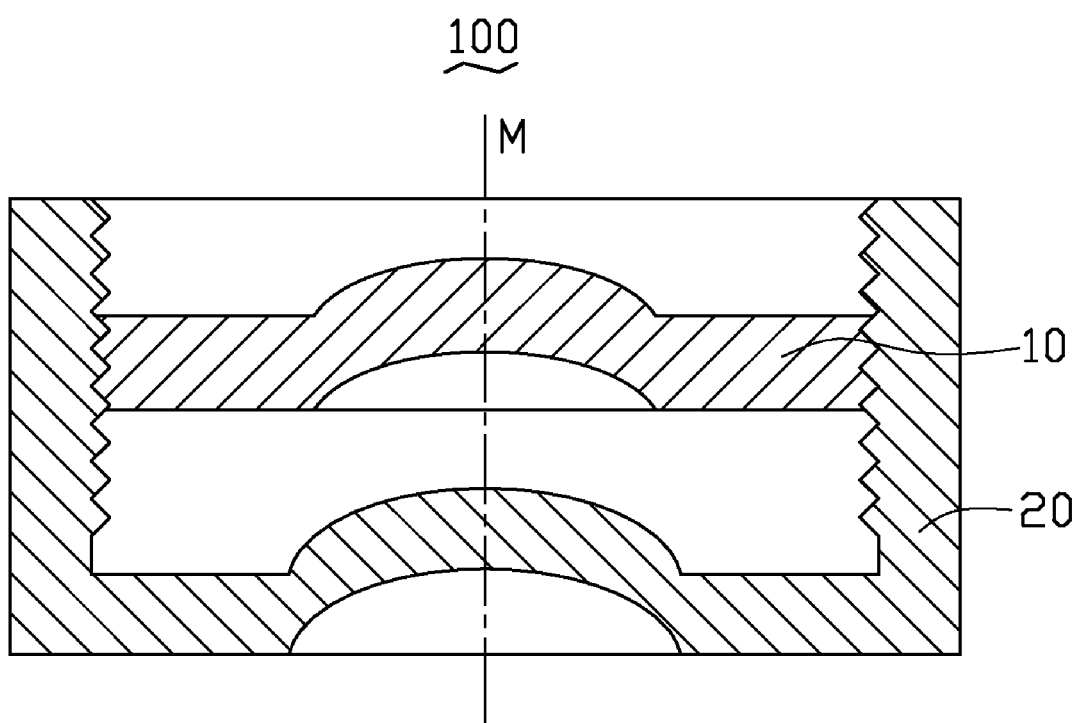
FIG. 1 is a schematic, cross-sectional view of a lens assembly, according to a first embodiment.

Referring to FIG. 1, a lens assembly 100 according to a first embodiment is shown. The lens assembly 100 includes a first lens 10 and a second lens 20.

Figure 2:
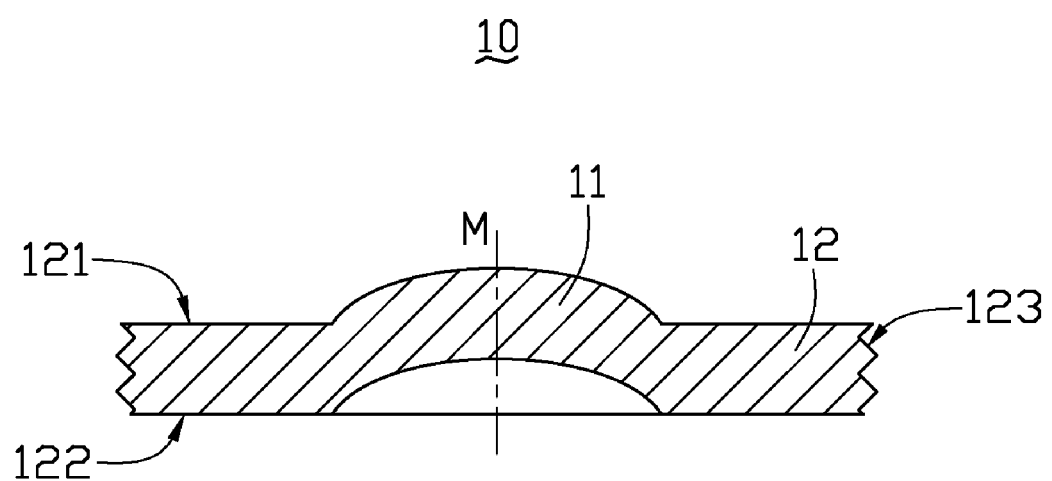
FIG. 2 is a schematic, cross-sectional view of a first lens in the lens assembly of FIG. 1.

Referring to FIG. 2, the first lens 10 includes a first optically active part 11 and a first optically inactive part 12 surrounding the first optically active part 11. The first optically inactive part 12 is annular and includes a first surface 121, an opposite second surface 122, and a side surface (not labeled) connecting the first and the second surfaces 121, 122. The side surface has an external thread 123 formed thereon. The first optically active part 11 is configured for refracting light transmitting therethrough. The first lens 10 has an optical axis M. The first optically active part 11 of the first lens 10 can be a convex lens or a concave lens.

Figure 3:
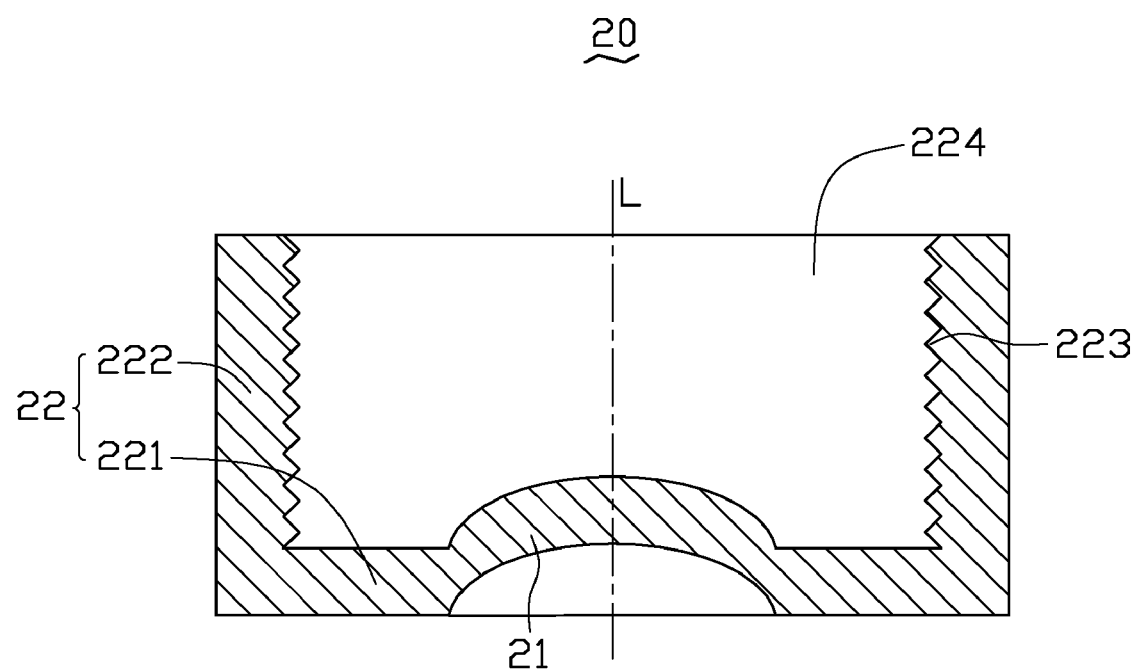
FIG. 3 is a schematic, cross-sectional view of a second lens in the lens assembly of FIG. 1.

Referring to FIG. 3, a second lens 20 according to a first embodiment is shown. The second lens 20 has an optical axis L. Similar to the first lens 10, the second lens 20 includes a second optically active part 21 and a second optically inactive part 22 surrounding the second optically active part 21. The second optically inactive part 22 includes a base 221 and a peripheral sidewall 222 extending in a direction substantially parallel to the optical axis L. The sidewall 222 is a hollow cylinder with a central axis (not labeled). The central axis aligns with the optical axis L. The second optically active part 21, the base 221 and the sidewall 222 are integrally formed, and cooperatively define an accommodating space 224 for receiving the first lens 10 therein. The sidewall 222 has an internal thread 223 formed on an internal surface (not labeled) thereof. The internal thread 223 matches with the external thread 123. The second optically active part 21 of the second lens 20 can be a convex lens or a concave lens. An inner diameter of the second lens 20 is equal to an outer diameter of the firs lens 10.

Referring to FIG. 1 again, in assembly, as the first lens 10 rotates, the first lens 10 moves along the optical axis M thereof until a predetermined distance between the first lens 10 and the second lens 20 is achieved. In this position, the first lens 10 is securely engaged in the second lens 20, and the optical axis M aligns with the optical axis L.

It should be noted that more than one lens with external threads can be engaged with the second lens 20. The second lens 20 functions as a barrel so that a lens module employing the lens assembly 100 eliminates the use of a barrel. Accordingly, the lens module is more light-weight and smaller in volume.

Figure 4:
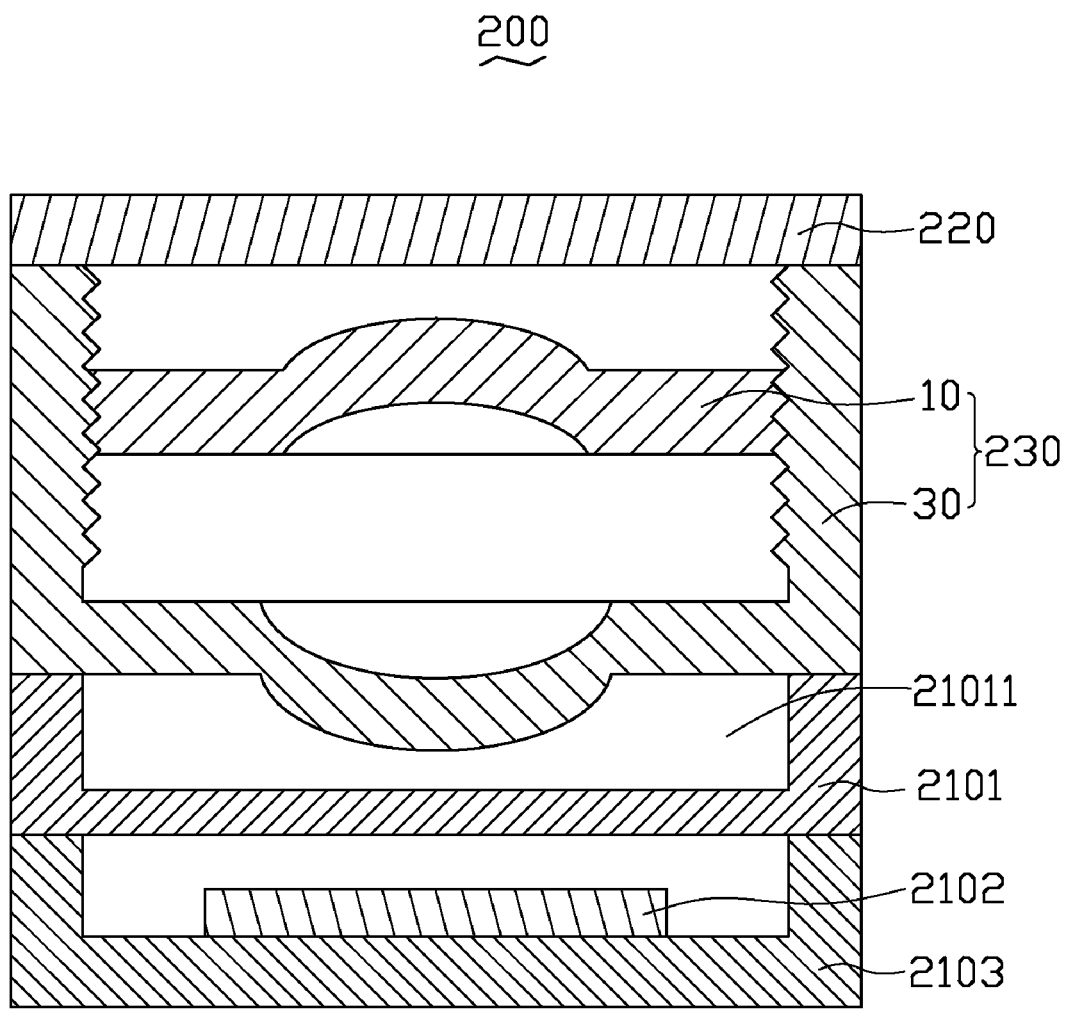
FIG. 4 is a schematic, cross-sectional view of a lens module, according to a second embodiment.

Referring to FIG. 4, a camera module 200 according to a second embodiment is shown. The camera module 200 includes a diaphragm 220, a lens assembly 230, a cover board 2101, an image sensor 2102, and a holder 2103, arranged in the order written.

The diaphragm 220 is configured for adjusting the amount of light passing through the camera module 200. Similar to the lens assembly 100 of FIG. 1, the lens assembly 230 includes a first lens 10 and a third lens 30. The third lens 30 is a concave lens 30. The cover board 2101 defines a chamber 21011 therein. Part of the third lens 30 is received in the chamber 21011. The cover board 2101 can be made of light permeable material. In particular, the cover board 2101 is made of transparent material. The holder 2103 and the cover board 2101 cooperatively define a space therebetween for accommodating the image sensor 2102. The cover board 2101 prevents the image sensor 2102 from being polluted.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. A lens having an optical axis, the lens comprising:
   an optically active part; and
   an optically inactive part surrounding the optically active part, the optically inactive part comprising a base and a peripheral sidewall extending in a direction parallel to the optical axis, the base connected with the optically active part, the peripheral side wall forming a hollow cylinder and having an internal thread formed on an internal surface thereof.

2. The lens as claimed in claim 1, wherein the base, the sidewall and the optically active part cooperatively define an accommodating space therein.

3. The lens as claimed in claim 1, wherein the hollow cylinder comprises a central axis, and the central axis aligns with the optical axis.

4. The lens as claimed in claim 1, wherein the optically active part of the lens is a convex lens or a concave lens.

5. A lens comprising:
an optically active part; and
an optically inactive part surrounding the optically active part, the optically inactive part and the optically active part being integrated as a unitary piece, the optically inactive part comprising a first surface, an opposite second surface, and a peripheral side surface connecting the first and the second surfaces, the peripheral side surface having an external thread formed thereon.

6. The lens as claimed in claim 5, wherein the optically inactive part is annular.

7. The lens as claimed in claim 5, wherein the optically active part of the lens is a convex lens or a concave lens.

8. The lens as claimed in claim 5, wherein the optically inactive part and the optically active part are comprised of the same material.

9. A lens assembly comprising:
a first lens comprising:
a first optically active part; and
a first optically inactive part surrounding the first optically active part, the first optically inactive part comprising a first surface, an opposite second surface, and a peripheral side surface connecting the first and the second surfaces, the peripheral side surface having an external thread formed thereon; and a second lens having an optical axis, the second lens comprising:
a second optically active part; and
a second optically inactive part surrounding the second optically active part, the second optically inactive part comprising a base and a peripheral sidewall extending in a direction parallel to the optical axis, the base connected with the optically active part, the peripheral side wall forming a hollow cylinder and having an internal surface, the internal surface having an internal thread formed thereon, the base, the sidewall and the second optically active part cooperatively defined an accommodating space, the first lens being received in the accommodating space, the first lens being threadedly engaged with the second lens.

10. The lens assembly as claimed in claim 9, wherein the internal thread matches with the external thread.

11. The lens assembly as claimed in claim 9, wherein an outer diameter of the first lens is equal to an inner diameter of the second lens.

12. The lens assembly as claimed in claim 9, wherein the first lens has an optical axis, and the optical axis of the first lens aligns with that of the second lens.

13. The lens assembly as claimed in claim 9, wherein the hollow cylinder comprises a central axis, and the central axis aligns with the optical axis.

14. The lens assembly as claimed in claim 9, wherein the first optically inactive part is annular.

15. The lens assembly as claimed in claim 9, wherein the optically active part of the first lens is a convex lens or a concave lens.

16. The lens assembly as claimed in claim 9, wherein the optically active part of the second lens is a convex lens or a concave lens.

* * * * *